(12) United States Patent
Radunovic et al.

(10) Patent No.: US 7,912,003 B2
(45) Date of Patent: Mar. 22, 2011

(54) MULTIPATH FORWARDING ALGORITHMS USING NETWORK CODING

(75) Inventors: Bozidar Radunovic, Cambridge (GB);
Christos Gkantsidis, Cambridge (GB);
Peter B. Key, Cambridge (GB); Dinan Gunawardena, Cambridge (GB);
Wenjun Hu, Cambridge (GB); Pablo Rodriguez, Barcelona (ES)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 11/769,669

(22) Filed: Jun. 27, 2007

(65) Prior Publication Data

US 2009/0003216 A1 Jan. 1, 2009

(51) Int. Cl.
*H04M 4/00* (2006.01)

(52) U.S. Cl. ........ 370/329; 370/237; 370/235; 370/321; 370/337; 370/458; 370/328

(58) Field of Classification Search .................. 455/445; 370/237–238, 329, 351, 428, 252, 277, 278, 370/229–235, 458, 337, 321, 338, 328
See application file for complete search history.

(56) References Cited

U.S. PATENT DOCUMENTS

| 6,714,787 | B2 | 3/2004 | Reed et al. |
| 2006/0146716 | A1 | 7/2006 | Lun et al. |
| 2006/0146875 | A1 | 7/2006 | Yang |
| 2006/0245442 | A1* | 11/2006 | Srikrishna et al. ........... 370/406 |
| 2006/0251062 | A1* | 11/2006 | Jain et al. ..................... 370/389 |
| 2007/0066315 | A1* | 3/2007 | Kado ............................ 455/445 |
| 2007/0081603 | A1 | 4/2007 | Jang et al. |

FOREIGN PATENT DOCUMENTS

| WO | WO 2006/071187 | * | 7/2006 |
| WO | WO 2007/008123 | * | 1/2007 |
| WO | WO2007035462 | | 3/2007 |

OTHER PUBLICATIONS

Biswas, et. al., "ExOR Opportunistic Multi-Hop routing for Wireless Networks", SIGCOMM'05, Aug. 21-26, 2005, Philadelphia, Pennsylvania, USA.
Chaporkar, et al., "Throughout Guarantees Through Maximal Scheduling in Wireless Networks", 43rd Allerton conference, 2005.
Deb, et. al., "Network Coding for Wireless Applications: A Breif Tutorial", Coorinated Science Laboratory, University of Illinois at Urbana-Champaign, Lucent Bell Laboratories, Data Compression Laboratory, California Institute of Technology Computer Science & Artificial Intelligence Laboratory, Massachusetts Institute of Technology.
Ho, et al., "Online Incremental Network Coding for Multiple Unicasts", Coordinated Science Laboratory, University of Illinois at Urbana-Champaign.

(Continued)

*Primary Examiner* — Kamran Afshar
*Assistant Examiner* — Lameka J Kirk
(74) *Attorney, Agent, or Firm* — Lee & Hayes, PLLC

(57) ABSTRACT

A method of transmitting data across a wireless mesh network is described which uses network coding at each of the intermediate nodes between the source node and the destination node. Each intermediate node also controls the rate at which it broadcasts packets based on link congestion and the backlog of packets at each of the possible next-hop nodes for the data flow.

19 Claims, 16 Drawing Sheets

OTHER PUBLICATIONS

Katti, et al., "Network Coding Made Practical", Computer Science and Artificial Intelligence Laboratory Technical Report, MIT-CSAIL-TR-2006-009, Feb. 16, 2006.

Katti, et al., "XORs In The Air: Practical Wireless Network Coding".

Li, et al., "Network Coding in Unidirected Networks", Department of Electrical and Computer Engineering, University of Toronto.

Li, et al., "Network Coding: The Case of Multiple Unicast Sessions", Department of Electrical and Computer Engineering, University of Toronto.

Lun, et al., "Achieving Minimum-Cost Multicast: A Decentralized Approach Based on Network Coding".

Lun, et al., "Network Coding for Efficient Wireless Unicast".

Lun, et al., "On Coding for Reliable Communication Over Packet Networks".

Ramoorthy, et al., "On the Capacity of Network Coding for Random Networks", IEEE Transactions on Information Theory, vol. 51, No. 8, Aug. 2005.

Raniwala, et al., "Centralized Channel Assignment & Routing Algorithms for Multi-Channel Wireless Mesh Networks".

Tassiulas, et al., "Stability Properties of Constrained Queuing Systems and Scheduling Policies for Maximum Throughput in Multihop Radio Networks", IEEE Transactions on Automatic Control, vol. 37, No. 12, Dec. 1992.

Wu, et al., "Information Exchange in Wireless Networks with Network Coding and Physical-Layer Broadcast", Technical Report MSR-TR-2004-78, Aug. 2004.

* cited by examiner

MULTIPATH FORWARDING ALGORITHMS USING NETWORK CODING

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Wireless mesh networks provide a way of creating low cost, flexible networks which may be deployed for many different applications, such as in disaster zones to rapidly provide communication infrastructure or in offices to enable the wireless office. However, aspects of the wireless medium, such as its broadcast nature, inherent variability and interference problems make designing efficient, high throughput networks challenging.

Wireless mesh networks offer the ability to use multiple paths to increase the capacity of the transmission of information link between two nodes, however, since any packet transmitted by a node may be received by more than one node (because of the broadcast nature of the medium), coordination between nodes is required to avoid duplicate transmissions. This coordination generally involves complex signaling and extra communication overhead as nodes communicate with each other to decide which nodes will forward which packets. This reduces the benefit of using multiple paths and complicates any implementation.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method of transmitting data across a wireless mesh network is described which uses network coding at each of the intermediate nodes between the source node and the destination node. Each intermediate node also controls the rate at which it broadcasts packets based on link congestion and the backlog of packets at each of the possible next-hop nodes for the data flow.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
FIG. 1 is a schematic diagram of a simple wireless mesh network.
Figure 1:
Figure 1:
Figure 1:

FIG. 1 shows a very simple wireless mesh network which comprises four nodes 1-4. Due to the broadcast nature of the wireless medium, when node 1 transmits a packet, one or more nodes may receive it. Unless the nodes communicate, the nodes do not know if the packet they received has also been received by another node. For example, if both nodes 2 and 3 receive the packet (and node 4 does not) and then both nodes 2 and 3 forward the packet to the destination (node 4) there will be duplication and/or network resources will have been used inefficiently (i.e. one of the nodes could have used the same time slot to transmit something else instead of the packet received from node 1).

If network coding is used at intermediate nodes (e.g. nodes 2 and 3), the information transmitted by intermediate nodes is mixed (e.g. using random coefficients) and the protocol overheads, which are otherwise required to avoid packet duplication, can be reduced. For example, if the source node (node 1) transmits three packets, both intermediate nodes 2 and 3 may not receive all three packets because of errors in the wireless channels and the inherent variability of the wireless transmission medium (e.g. due to interference from other nodes not shown in FIG. 1). If node 2 receives packets 1 and 2 and node 3 receives packets 1 and 3, each intermediate node combines the packets they have received (e.g. as a linear combination) and forwards encoded packets (instead of the packets they actually received). In this example, node 2 forwards the combination 1+2 and node 3 forwards the combination 1+3. When the destination node (node 4) has received sufficient encoded packets (e.g. three packets comprising: 1+2, 1+3 and 1−3, in the simple example above), it can decode the packets to obtain the original transmitted packets (e.g. packets 1, 2 and 3 in this example). This combining of packets of data is referred to as 'network coding' and this is described in more detail below.

Figure 2:
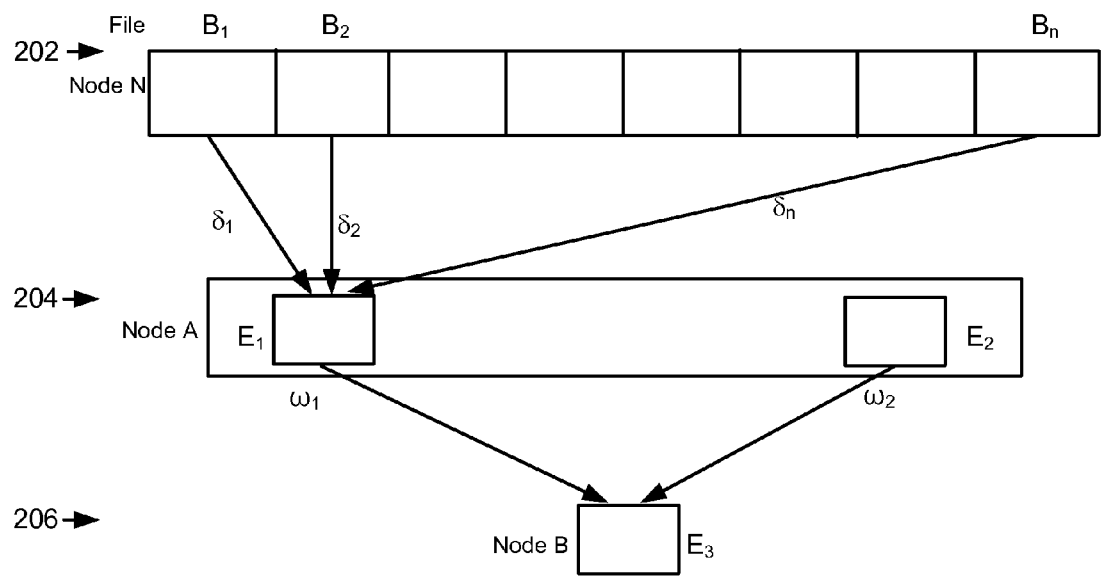
FIG. 2 is a schematic diagram showing network coding.

The use of network coding can be described with reference to FIG. 2, which shows the flow of packets (or blocks) between a first intermediate node, node N 202 and two subsequent intermediate nodes, node A 204 and node B 206. Node N holds n blocks, $B_1$-$B_n$, and instead of sending one of these blocks to node A (which may or may not be useful), node N produces an encoded block $E_1$ which is a linear combination of all the blocks held by node N, such that:

$$E_1 = \delta_1 B_1 + \delta_2 B_2 + \ldots + \delta_n B_n$$

where $\delta_i$ are random coefficients (and may be referred to as the coefficient vector $\bar{\delta}$ or $\delta_i$). In order that the block size does not increase in size, these operations take place within a finite field, typically in a Galois Field $GF(2^8)$. Node N then transmits to node A both the newly encoded block $E_1$ and the coefficient vector ($\delta_i$). Node A may also receive a second encoded block $E_2$ from another intermediate node, created from all the blocks held by that other intermediate node (e.g. $B_1, B_3, B_5, B_7 \ldots B_m$) using a second set of random coefficients $\epsilon_i$. When node A needs to transmit a block to node B, node A creates a third encoded block, $E_3$ from a linear combination of the blocks it holds ($E_1$ and $E_2$) using random coefficients $\omega_i$. Node A transmits not only coefficients $\omega_i$ but also the original coefficients used in creating encoded blocks $E_1$ and $E_2$, i.e. in addition to block $E_3$, node A transmits the following to node B (for this example):

$$(\omega_1\delta_1 + \omega_2\epsilon_1, \omega_1\delta_2, \omega_1\delta_3 + \omega_2\epsilon_3, \ldots)$$

When network coding is used in this way, a destination node can recover the original data comprising x blocks (or packets) after receiving x blocks which are linearly independent from each other (i.e. x packets with linearly independent coefficient vectors), in a process similar to solving a set of linear equations. If the coefficients are chosen at random by each intermediate node, a destination node will be unlikely to receive a block which is not of use to that node. Each node can decide whether to receive and store a packet based on the coefficients vector; if the coefficient vector of the received packet can be expressed as a linear combination of the coefficient vectors that are already stored by the node, i.e. the received packet is redundant and may be dropped.

In the example above, a Galois Field $GF(2^8)$ has been used as the base arithmetic field, which has a size of 256 elements. The size of the field is large enough to guarantee good diversity (at least for networks of sizes of a few hundred nodes) and is small enough to allow efficient encoding and decoding operations. Depending on the network size and other requirements, alternative base arithmetic fields may be used.

Network coding and optimization techniques for network coding are described in the following patent applications which are hereby incorporated herein by reference in their entirety:

U.S. patent application Ser. No. 11/152,754 entitled 'Content Distribution Using Network Coding' filed Jun. 16, 2005 which claimed priority from U.S. Provisional patent application No. 60/585,212 filed 2 Jul. 2004

U.S. patent application Ser. No. 11/191,761 entitled 'Security for Network Coding File Distribution' filed Jul. 27, 2005

European patent application number 05270098.6 entitled 'Encoding and Decoding Optimizations' filed Dec. 22, 2005

Whilst these applications describe (amongst other things) the use of network coding for content distribution (e.g. in peer-to-peer systems), these techniques can also be applied in a wireless mesh network.

The benefits of multi-hop routing and the use of network coding to improve the throughput of a wireless mesh network can be demonstrated mathematically using the simple network shown in FIG. 1. The network of FIG. 1 comprises a 4-node, 2-hop network, where node 1 can be considered the source, node 4 the destination, and 2 and 3 are relay (or intermediate) nodes. It is assumed (for the purposes of this mathematical comparison) that node 1 can broadcast to nodes 2 and 3, but that nodes 1 and 4 can not communicate with each other. In this simple example, only one node is active at any one time, however in larger networks, where there are nodes which can transmit simultaneously without interfering, multiple non-interfering nodes may be active at any one time (e.g. sub-groups of nodes may have orthogonal scheduling schemes). For the purposes of this comparison, the objective is defined to be to maximize the information flow f between source and destination, subject to the network constraints, where the flow f is interpreted as the throughput, in unique packets received per unit time. It may be assumed (again for the purpose of this comparison only) that the source generates fresh packets at a certain rate. These packets are transmitted over the network, encoded at intermediate nodes (acting as relays), and eventually received by the destination. The received flow rate is the rate at which packets of the source stream can be reconstructed.

The routing problem asks which route packets should take: how many should be sent via node 2 and how many via node 3. The scheduling problem determines the packet schedule at each node. Let $\alpha_i$ denote the fraction of time node i is active (hence $\Sigma_i \alpha_i = 1$). Suppose that nodes broadcast packets at the same rate of 1 packet per time unit, and that packets transmitted by i are successfully received by j with probability $p_{ij}$. Here $1-p_{ij}$ is the erasure probability, and incorporates the effects of the physical (PHY) layer, interference, buffer overruns and MAC retransmissions. To ease the description, it is set that $p_{12}=p_{13}=p$ and $p_{24}=p_{34}=q$ with probabilities assumed independent.

For this comparison $r_{ij}$ for a set J is defined to be the information rate on links ij, that is the rate at which linearly-independent packets from i are received (and may be forwarded) by any of the nodes in the set J, where J is the set of nodes that can receive information from i. The $r_{ij}$ can be interpreted as the carried flow rate.

Under these assumptions of independent erasure probabilities:

$$r_{i\{J\}} \leq \alpha_i \left(1 - \prod_{j \in \{J\}} (1 - p_{ij})\right) \quad (1)$$

where $r_{1i} \leq \alpha_1 p$ and $r_{i4} \leq \alpha_i q$ for i=2,3. This can then be used to explore throughput using different routing and scheduling policies.

For multipath routing with network coding, the same packets may be received by nodes 2 and 3 when node 1 broadcasts. Using the bound equation (1) the following constraint is obtained $$r_{1\{2,3\}} \leq \alpha_i(1-(1-p)^2) = \alpha_1 p_b \quad (2)$$

which is achievable where $$p_b \stackrel{def}{=} 1 - (1-p)^2$$

is the probability at least one broadcast packet reaches a relay node. The optimal flow has to satisfy $f \leq r_{1,\{2,3\}}$, $f \leq r_{24}+r_{34}$ and with the constraints $r_{1,\{2,3\}} \leq r_{12}+r_{13}$, $r_{1i} \leq r_{i4}$ it is straightforward to show that the unique solution is $$f_{nc} = \frac{p_b q}{p_b + q}, \quad \alpha_1 = \frac{q}{p_b + q} \quad (3)$$

Uniqueness follows since this is effectively solving a linear program—given that the p's are assumed fixed, this is a linear objective function maximized over linear constraints, solving for non-negative variables (the $\alpha_i$ and $r_{ij}$). Networking coding is implicit in this solution, ensuring that what is received at relay nodes 2 and 3 is useful to node 4; nodes 2 and 3 recode the packets they receive. Indeed, it is possible to show that a random linear coding scheme can get arbitrarily close to this rate (with arbitrarily small error probability, provided that a large number of packets are considered), where the intermediate nodes generate random linear combinations (over the appropriate field) of packets they receive.

The above relation (3) holds more generally if there are n relay nodes instead of 2, where all links interfere (only one node may transmit at a time). Letting 1 be the source, n+2 the destination, and $\{2, \ldots, n+1\}$ relays, with $P_{1,n+2}=0$, $p=p_{1i}$, $q=p_{i,n+2}$ and $p_b=1-(1-p)^n$. A rate constraint on the first cut, between the source and the relays, is $f_{nc} \leq \alpha_1 p_b$ and a rate constraint on the second cut is $(1-\alpha_1)q$. From there the maximal average end-to-end rate $$f_{nc} = \frac{p_b q}{p_b + q}$$

is readily obtained.

For naive multipath routing without network coding, intermediate relay nodes just relay received packets, hence duplicate packets may be received by the destination, and the 'double-counted' packets must be substracted. As before, $r_{1,\{2,3\}}$ is given from the bound (2), however now the aggregate rate at the destination is bounded above by $(1-\alpha_1)q - \alpha_1 p^2$, since there are $\alpha_1 p^2$ duplicate packets on the average. In this case, the (unique) maximum rate is given by $$f_{mp} = \frac{p_b q}{q + 2p}, \quad \alpha_1 = \frac{q}{q + 2p} \quad (4)$$

The equation generalizes when there are n relays, the average rate of duplicated packets is $\alpha_1(np-p_b)$, the rate constraint on the second cut is $(1-\alpha_1)q - \alpha_1(np-p_b)$, hence the maximal average end-to-end rate is $$f_{mp} = \frac{p_b q}{q + np} \quad (5)$$

Note that $f_{mp} \leq f_{nc}$.

With fixed routing, only one path can be used. In this case:

$$f_{fr} = \frac{pq}{p+q}$$

with $$\alpha = \frac{p}{p+q}.$$

Even in this simple scenario described above, a benefit from multipath routing is obtained ($f_{nc} > f_{fr}$) provided the links to the relays are not lossless (p<1). The improvement ratio $f_{nc}/f_{fr} = p_b(p+q)/p(p_b+q)$ increases with n, the number of relay nodes, and q, and decreases as p increases, i.e. the less reliable the broadcast links, the bigger the gain. Indeed, with q=1 and small p (very unreliable broadcast links) the ratio is n+O(p), which illustrates the potential benefits. The gain is bounded above by ½p+½. This also demonstrates that network coding always gives an advantage over naive multipath routing. Network coding makes transmissions more efficient as it eliminates the redundancy, especially when the number of paths is large.

In FIG. 1 the network coding is implemented on a per-flow basis, i.e. where an intermediate node holds packets from multiple flows, only those packets from the same flow are linearly combined to form an encoded packet. A flow is defined as an ordered collection of packets that need to be transferred from one wireless mesh node, the source, to another node, the destination. The flows may be composed of packets from different upper layer traffic (e.g. TCP), or even from different machines and may include acknowledgements for packets received in flows going in the opposite direction (referred to herein as 'reverse path acknowledgements'); the only requirement is that the packets have the same source and destination. For example, if there are two flows of data, one from node 1 to node 4, comprising packets $F_x$ and one from node 4 to node 1, comprising packets $B_x$, if an intermediate node holds packets $F_1$, $F_2$, $B_2$, $B_3$, packets $F_1$ and $F_2$ will be combined into an encoded packet and packets $B_2$ and $B_3$ will be combined into a separate encoded packet.

Figure 5:
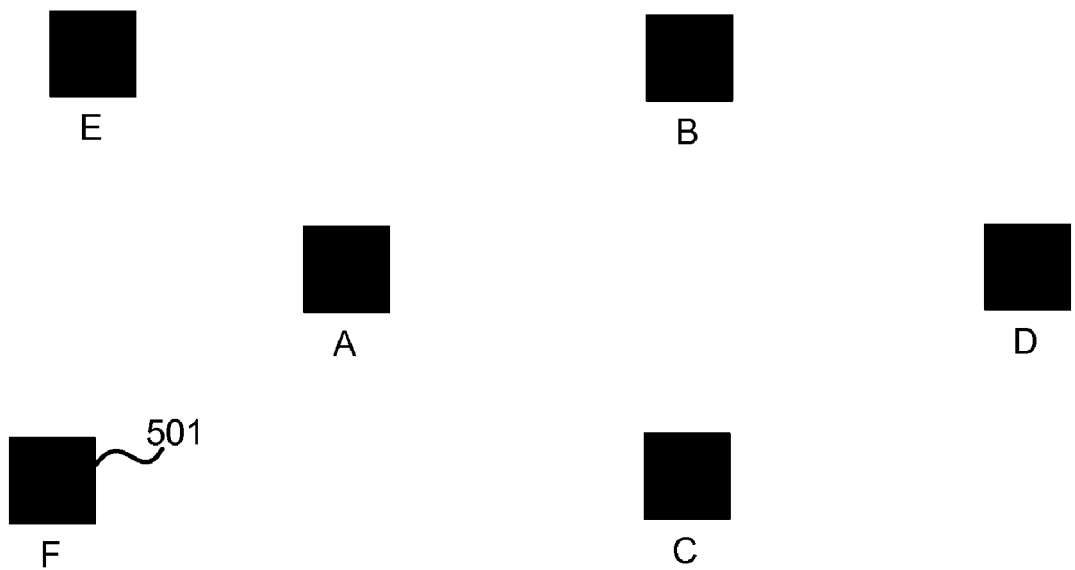
FIG. 5 is a second schematic diagram of a simple wireless mesh network.

The source and destination nodes of a flow may be on the edges of a wireless mesh network, such that all the packets of a flow enter the wireless mesh network at the source and leave at the destination. However, the methods may also be used within a wireless mesh network where there is a common sub-path, for example considering the example mesh network shown in FIG. 5, there may be one flow (flow 1) from node E to node D and a second flow (flow 2) from node F to node D. The methods described herein may be used over the common sub-path from node A to node D, with the flows being considered a combined flow (flow 3). This may be in addition to (or instead of) use of the methods on the individual flows from E to D (flow 1) and F to D (flow 2).

The network coding may be implemented over the entire data element which is to be sent or alternatively, the groups of blocks (or packets) which make up a data element may be grouped into portions or generations and the network coding may be implemented only within a generation. A generation may be of fixed size, (e.g. 32 packets) or the size may be variable. The size of a generation may, for example, vary over the timescales of the system, for example by varying the generation size with evolution of the TCP congestion send/receive window. The size of the generation may be selected to meet particular performance and design requirements because larger generations allow for more encoding and improve system efficiency, but also require more buffer space. Smaller generations exploit less diversity and are less efficient but result in smaller delays in transmission.

Figure 3:
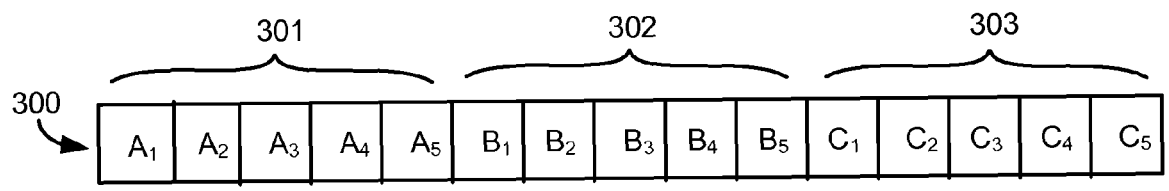
FIG. 3 shows a schematic diagram of a data element divided into three generations.

FIG. 3 shows a schematic diagram of a data element 300 divided into three generations. In this example, the network coding would be performed by intermediate nodes within a generation such that packets $A_x$ would be combined, packets $B_x$ would be combined and packets $C_x$ would be combined (but packets $A_x$ would not be combined with packets $B_x$ or $C_x$, etc). The destination tries to decode packets as new encoded packets arrive and in the worst case, the entire generation will be decoded when sufficient linearly independent packets from that generation arrive.

In some implementations, each of the packets may be the same size, with smaller packets being padded or combined together (e.g. multiple acknowledgement packets). However, in other implementations packets of different sizes may be used and coding schemes may be adopted to combine packets of similar sizes in order to improve the efficiency of the system.

Network coding is implemented at intermediate nodes and in addition to this the source node may, in some embodiments, also encode packets using network coding prior to transmission. If network coding is used by the source node, the source node transmits X linearly independent packets for each generation, where there are X packets within the generation. Irrespective of whether network coding is used for initial transmission by the source node, network coding may be used by the source node in an error-correction or re-transmission scheme (e.g. as described in more detail below).

In addition to implementing network coding at intermediate nodes, the rate at which encoded packets are broadcast by each node (whether an intermediate node or a source node) is controlled. This rate control is implemented in a distributed (and decentralized) manner, such that each node controls the rate at which it distributes packets and also which next-hop node to use for each packet it relays. Use of such a distributed rate control method reduces the protocol overhead within the network. The rate is controlled on the basis of the backlog of packets for transmission to next-hop neighbor nodes (also referred to as 'backpressure') and this has the effect of directing traffic to appropriate parts of the network, i.e. those paths which are least loaded and/or most reliable. This rate control technique can adapt fast to variations in link qualities and congestion signals coming from different paths and can also react to packet losses.

Figure 4:
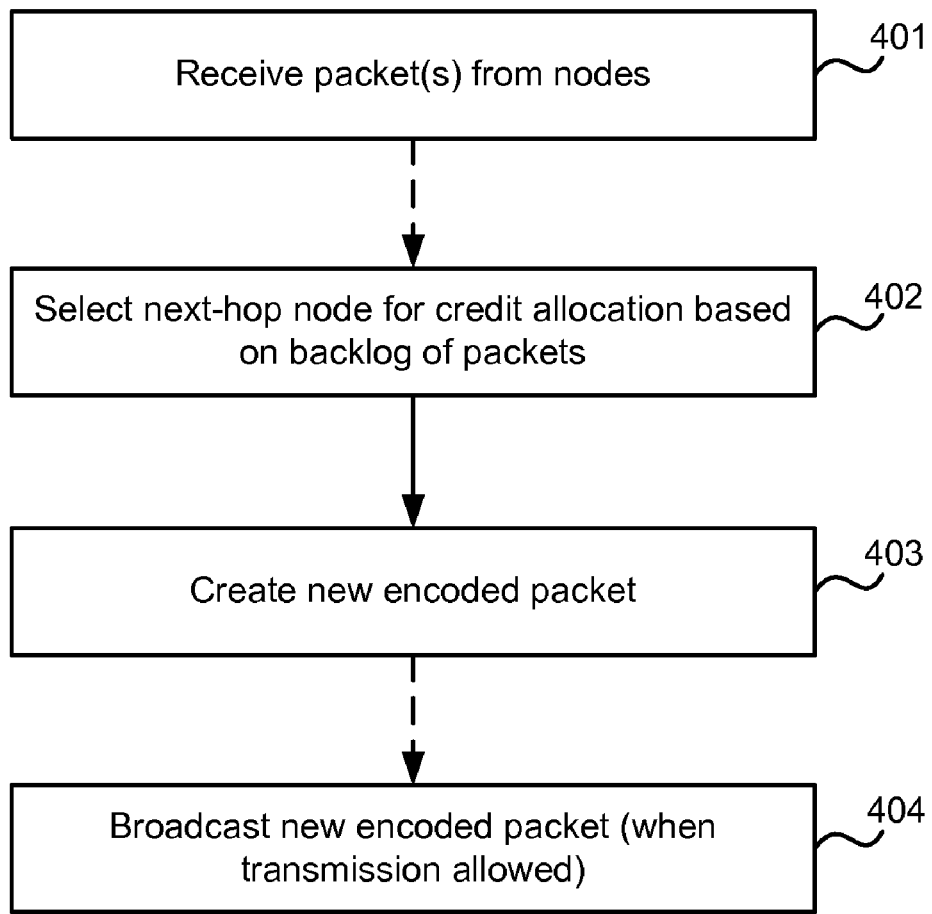
FIG. 4 shows an example flow diagram of a method of operation of an intermediate node.

FIG. 4 shows an example flow diagram of a method of operation of an intermediate node in which the intermediate node receives (and stores) one or more packets from another node (block 401). This other node may be a source node or another intermediate node. The intermediate node then (e.g. in response to a trigger, such as defined by the routing decision described below) selects the next-hop node for credit allocation based on the backlog of packets for transmission to next-hop neighbor nodes (block 402). Before broadcasting a packet (in block 404), the intermediate node creates a new encoded packet from a linear combination of packets held at that node which are from the same flow and the same generation (block 403) and it is this new encoded packet which is broadcast by the node (in block 404) when transmission by the node is allowed (as described in more detail below). The new encoded packet may be created (in block 403) immediately prior to transmission (in block 404) or alternatively, the newly encoded packet may be created following the credit transfer (in block 402) and then queued for transmission (as indicated by the dotted arrow between blocks 403 and 404 in FIG. 4). The operation of a source node is similar to that shown in FIG. 4, however, a source node does not receive packets from other nodes (in block 401) but instead receives data from higher layers and source nodes may, in some embodiments, not perform network coding (i.e. block 403 does not occur and an uncoded packet is broadcast in block 404). An example flow diagram showing the operation of a source node is provided in FIG. 6 and described below. The algorithms used in the methods are described in more detail below. It will be appreciated that the method steps are shown in a linear order by way of example only and, particularly where there are multiple parallel threads, the steps may not follow this linear order or may occur in a different order. Furthermore, there may be delays between the performance of steps (e.g. between blocks 401 and 402 and again between blocks 403 and 404).

The algorithms used within the mesh network are based on a credit system. The features of this credit system are:

Credits are created for each packet at the source node, and identified with a generation.

Credits are interpreted as the number of packets to be transferred by the node for a specific flow.

Credits are conserved where the end to end credit forwarding path is functional.

Credits are declarations of intent, and transferred by a (sending) node before packets are transmitted; the receiving node only updates such credits when successful packet transmission actually occurs.

Nodes also keep track of transmission-credits, associated with each subset j downstream nodes, which can be interpreted as the expected number of credits that must be received by at least one node in J.

When a credit is transferred from a node n to m, transmission credits are increased on all subsets J of downstream nodes that contain m.

When a packet is transmitted from node n to m, the transmission credits are decreased for all subsets J of downstream nodes that contain m.

Backpressure is used to determine where to route packets and where to transfer credits.

These features and the algorithms which are used are described in more detail below. Whilst specific algorithms are described below which use the credit system, in some implementations, other algorithms may be used which are based on the credits described herein or only a subset of those algorithms described below may be used in a particular system.

According to the credit system, credits are added to the source node of each flow when fresh packets are created. The rate at which fresh packets are generated by the source node will define the efficiency of the scheme and the fairness among flows. An algorithm for controlling the generation of packets is described in more detail below. In an example, one credit may correspond to one packet, although in other embodiments, different relationships between credits and data may be used. The credits are transferred across the mesh network from the source node to the destination node, with each node (whether a source or intermediate node) being responsible for all the credits it has received, and it is obliged to forward each credit to exactly one next-hop node. At the destination node, each packet receipt reduces the number of credits and generally the number of credits within the system is conserved, although losses may occur upon node failures or other error conditions. Retransmission schemes (as described below) or other error correction techniques may be used to minimize credit losses within the system. Each node within the network maintains a list of credits for each flow, C(n,c), which contains all the credits for flow c stored at node n (also referred to as per-node credits). The credit transfer scheme may be secured against attack (e.g. through authentication of nodes).

For each flow c, a node c has a number of next-hop neighbors, DST(n, c). This can be described with reference to FIG. 5 which shows a portion of a wireless mesh network comprising six nodes 501. Node A may have multiple neighbor nodes, where a neighbor of a node n is defined as one which can receive the broadcasts of node n, (e.g. nodes B, C, E and F) however, for a flow from node A to node D (where node A may be the source node for that flow or alternatively an intermediate node), only nodes B and C are on the way to destination node D and these are therefore referred to as the next-hop neighbors with respect to destination node D, DST (A, A/D). The next-hop neighbors for a particular flow may be identified using any suitable routing protocol, for example Virtual Ring Routing (VRR).

In addition to the per-node credits (C(n,c)), transmission credits are defined which are associated with broadcast links. For all subsets J of next-hop neighbors (i.e. where $J \subset DST(n, c)$), the transmission credit, TC(n,c,J) is defined to be the list of credits associated with broadcast link (n, J). In the example of FIG. 4 for the flow A→D, DST(A, A→D) comprises nodes B and C. Therefore there are three subsets, J, where $J_1$ comprises node B, $J_2$ comprises node C and $J_3$ comprises nodes B and C. Transmission credits describe the number of packets which are waiting to be transmitted to a next-hop node and are used to ensure that all credits from TC(n,c,J) will be transmitted to at least one of the nodes from set J. The use of transmission credits is described in more detail below.

Cumulative transmission credits for links within the mesh network are calculated and then used to define the state of congestion of a link. The cumulative transmission credit, CTC(n,c,m) for node n, flow c and a link from node n to node m, is defined as the sum of the transmission credits for each subset of next-hop neighbors which includes node m:

$$CTC(n, c, m) = \sum_{J \subseteq DST(nc,c), J \ni m} |TC(n, c, J)|.$$

Therefore for the simple example described above:

$$CTC(A, A \to D, B) = TC(A, A \to D, J_1) + TC(A, A \to D, J_3)$$

$$CTC(A, A \to D, C) = TC(A, A \to D, J_2) + TC(A, A \to D, J_3)$$

The higher the value of the cumulative transmission credit for a link from node n to node m, the more packets are waiting to be transmitted to node m and hence the more congested the link is. By controlling which links are used to forward packets based on the value of the CTC, packets will be sent over less congested links and the overall efficiency of the network will be increased.

Figure 6:
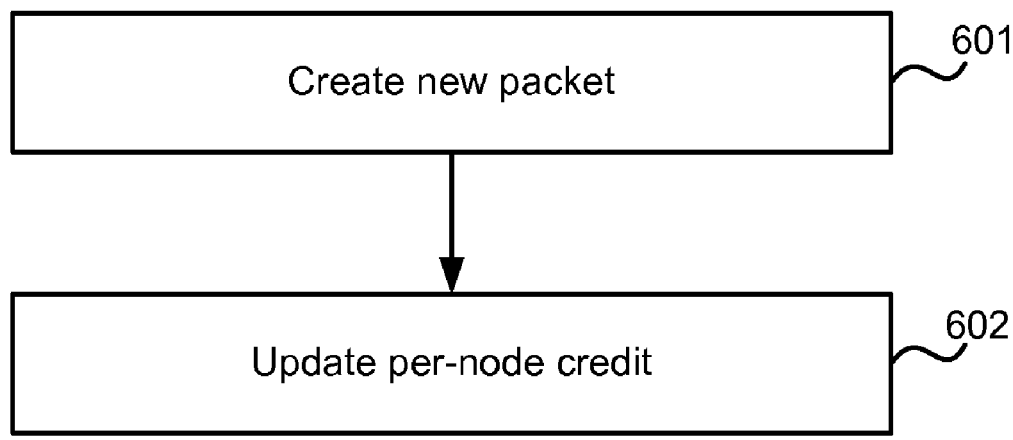
FIG. 6 shows an example flow diagram of a method of operation of a source node.

Credits are added to the source node of each flow (block 602) when fresh packets are created (block 601), as shown in the example flow diagram of FIG. 6. A source node is allowed to insert packets (and hence credits) into the system as a function of the source node's per-node credit, C(n,c), for that flow. The function may, in some embodiments, be inversely proportional to C(n,c), for example the source node may be permitted to insert no more than K/C(n, c) credits (and packets) per time unit, where K is an arbitrary constant. The higher K is, the higher the average queue size and delays in the network will be, but also with a higher value of K it is less likely that an empty queue will occur, hence the efficiency is higher. In another example, the transmission window of a node may be adapted such that it is inversely proportional to C(n,c). In a further example, flow control may be achieved through rate control (e.g. by varying the rate according to C(n,c)). As described above, each credit generated is associated with a particular generation.

Figure 7:
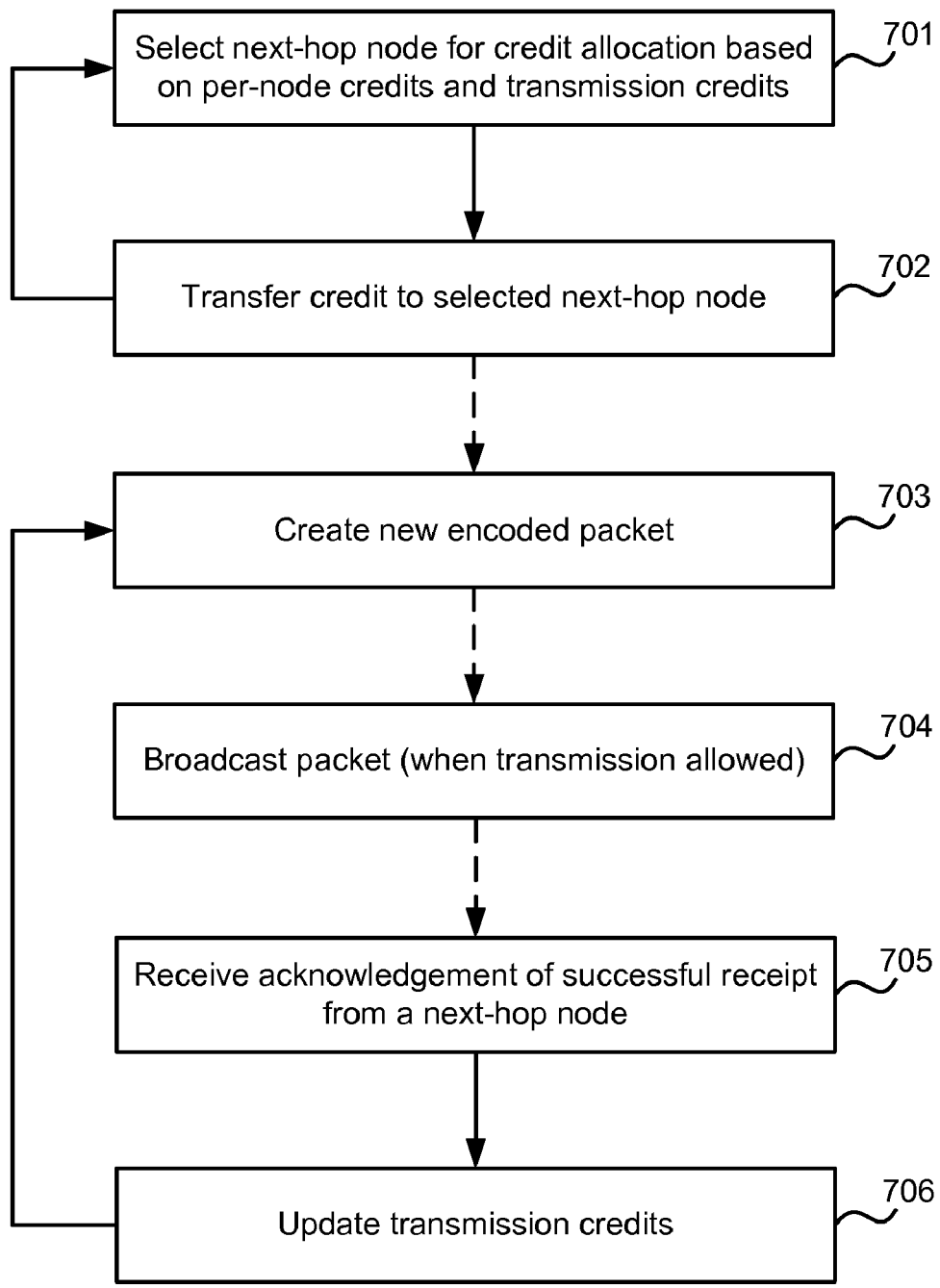
FIG. 7 shows a second example flow diagram of a method of operation of an intermediate node.
Figure 8:
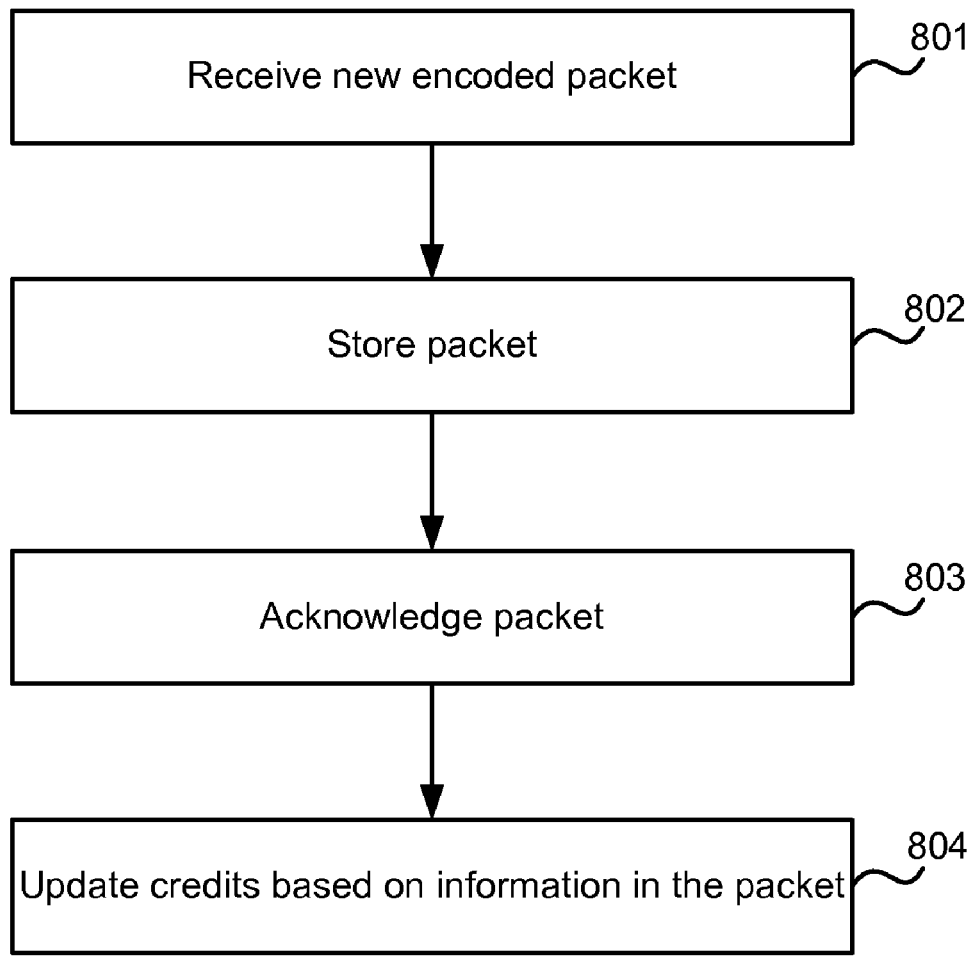
FIG. 8 shows an example flow diagram of a method of operation of a node upon receipt of packet broadcast by another node.
Figure 9:
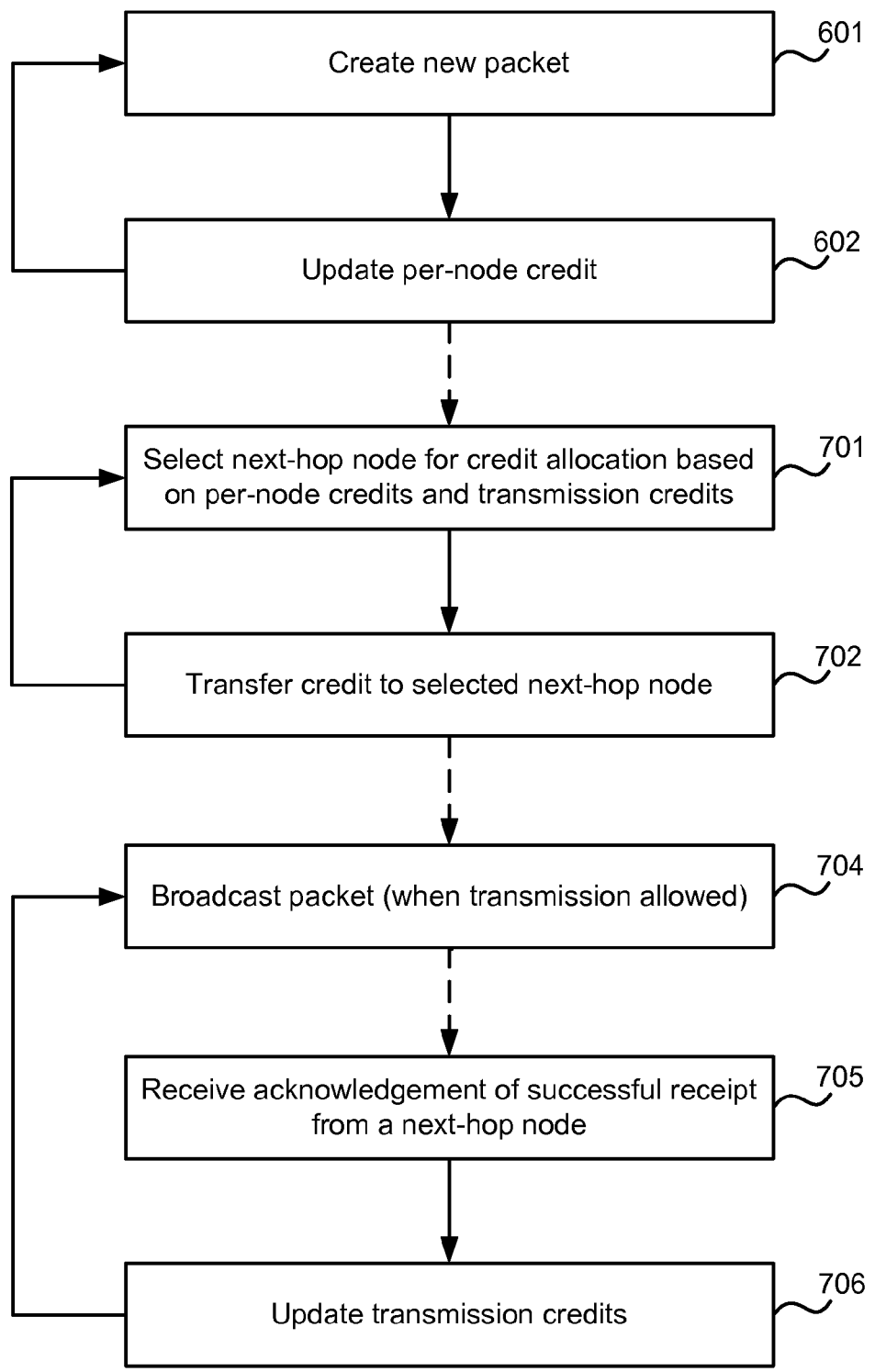
FIG. 9 shows a second example flow diagram of a method of operation of a source node.

When a node (be it source node or an intermediate node) gets an opportunity to transfer credit from a flow, c, it must select a node to transfer credit (and subsequently packets) to. As detailed above, credits are declarations of intent which are transferred by a (sending) node before packets are transmitted. The transfer of credits is separate from the subsequent transmission of packets and when a credit is transferred by a node this refers to an internal process within the node which updates credit values stored at that node. Transfer of a credit does not, therefore, result in any interference within the wireless mesh network and as a result multiple nodes may transfer credits substantially simultaneously. The node to which the credit is transferred (i.e. the receiving node for the credit) only updates its stored credit values when successful packet transmission actually occurs based on details of credit transfers included within the packet received. Credits at the sending node are adjusted upon acknowledgement of successful packet transmission, as described in more detail below. This is shown in the example flow diagrams in FIGS. 7 and 9 which show the operation of an intermediate node (FIG. 7) and a source node (FIG. 9). FIG. 8 shows the operation of a node which receives a packet broadcast by a sending node (be it a source node or an intermediate node). As shown in FIG. 7, an intermediate node selects a next-hop node for credit allocation based on per-node credits and transmissions credits (block 701) and then transfers a credit to the selected node (block 702, with notification of the credit transfer being sent to the selected node in the next packet transmitted). The intermediate node need not wait for authorization or any other signal to transfer a credit but can transfer credit as soon as a suitable next-hop node is identified. Subsequently, the intermediate node may be able to transmit a packet and at this point it creates a new encoded packet (block 703) from packets held at the node which are part of the same flow and the same generation. This newly created packet is then broadcast (block 704). Alternatively, the new encoded packet may be created following credit transfer and the packet may then be queued until transmission is allowed and the packet can be broadcast. As described above, each credit is associated with a generation and therefore the generation from which a newly encoded packet is created is determined based on the generation to which the credit transferred is associated. Upon receipt of this packet by another node (block 801), the receiving node stores the packet (block 802) and sends an acknowledgement back to the sending node (block 803). The acknowledgement of the packet may not necessarily be sent straight away (e.g. it may be included within a packet being sent in the opposite direction at the next opportunity). Acknowledgements may comprise active acknowledgements or passive acknowledgments, as described in more detail below. The receiving node also updates its stored credit values based on information within the received packet (block 804). If the sending of the acknowledgement (in block 803) is delayed, the updating of the stored credit values (block 804) may be performed prior to the sending of the acknowledgement. The intermediate node, upon receipt of the acknowledgement (in block 705) updates its values of transmission credits (block 706). Given that there may be a delay in sending the acknowledgement (block 803), there may be a significant delay between the broadcast of a packet (block 704) and the receipt of an acknowledgement (block 705). Additionally, if the block is received by more than one node, more than one receipt may be received. The operation of a source node is similar to that of an intermediate node, however the source node also creates packets and credits (blocks 601-602, as described above) and does not necessarily perform network coding (there is no block 703 in FIG. 9). However in some embodiments, the source code may perform network coding (such that the operation would be as shown in FIG. 9 with the addition of block 703 prior to block 704).

An active acknowledgement for a packet comprises a message (which may be included within another packet or flow) which is sent from the node that received the packet to the node that sent the packet. This message may be unicast or broadcast. A passive acknowledgement comprises including the acknowledgement information (such as the identifier of the packet received) in a transmission which is not specifically intended for the node that sent the packet. For example, the identifier for a packet received by a node may be included when a packet is next broadcast by that node to its next-hop neighbors. Use of passive acknowledgements may be more efficient (in that specific acknowledgements are not required) however the speed of acknowledgement to the sending node may be slower (as it is dependent on the receiving node being able to transmit to its next-hop nodes). Where this delay in acknowledgement is significant, it may result in re-transmissions (e.g. as described below) which reduces the overall efficiency. Use of passive acknowledgements may be limited by the wireless technology used within the mesh network. For example, where the transmission by a node is not omni-directional (e.g. through the use of directional antennas or as a result of the environment) it may not be possible for the node which sent the packet to receive transmissions made by the node which received the packet, where those transmissions are intended for one or more of the receiving node's next-hop nodes. In the methods described herein, active or passive acknowledgements (or both) may be used.

In an embodiment, a mechanism may be provided to ensure timely active acknowledgements if a node detects that the passive acknowledgements are not being received successfully. This can be described with reference to the system shown in FIG. 5. If node A receives a packet from node E and then subsequently includes the identifier for the packet in a subsequent broadcast intended for its next-hop nodes B and C, this comprises a passive acknowledgement for node E. If node E does not detect this packet acknowledgement, it may try and re-transmit the same packet one or more times. Upon detection at node A of these re-transmission attempts by node E (or after a predefined number of attempts have been detected at node A), node A may send an active acknowledgement to node E.

In some embodiments or applications it may be beneficial to have a two way acknowledgement process. In such an example, a second acknowledgement may be provided in response to receipt of the first acknowledgement (sent in block 803 and received in block 705). This second acknowledgement may be included within the next packet transmitted by the node (e.g. at the next instance of block 704) and may be heard by the node which transmitted the acknowledgement (in block 803). In some embodiments, a node may not be able to transmit a packet received from a second node until this second acknowledgement is received from that second node. In other embodiments, other processes may be dependent upon receipt of this second acknowledgement.

In order to select a node to transfer credit to, the following routing decision is used:

$$|C(n,c)| > |C(m,c)| + |CTC(n,c,m)|$$

This decision is checked for all nodes, m, which are next-hop neighbors for the flow (i.e. where $m \in DST(n,c)$) and operates over the entire flow (rather than on a per-generation basis), although other implementations may make decisions on part of the flow. The value of C(m,c) is periodically received at node n either in an acknowledgement (or other communication) sent by node m to node n or by node m overhearing a transmission from node m (to any node) which includes the value of C(m,c). As a result, the value of C(m,c) may not be the current version (as according to node m) but an older value of C(m,c). If the routing decision is true for several next-hops (i.e. for several nodes m), the node may select one of those next-hop nodes at random to transfer credit to. This routing decision has the effect that congested nodes (as identified by the value of C(m,c)) and congested links (as identified by the value of CTC(n,c,m)) are avoided and hence backpressure (i.e. pressure at subsequent points in the network) affects the routing decisions made at any particular node in the system. If either the node credit C(m,c) or the cumulative transmission credit CTC(n,c,m) are large, a node n will not forward any more packets in that direction and hence the queue will not build up. Once the congested node has successfully transmitted packets to its next-hop nodes, the value of its node credit and transmission credit (and hence CTC) will reduce and node n may subsequently be able to transfer additional credit to it.

When a node n transfers credit to a node m, the values stored at node n of the node credit for both node n (C(n,c)) and node m (C(m,c)) are updated, i.e. the value of C(n,c) decreases by one and the value of C(m,c) increases by one. However, credit updates are included in headers of actually transmitted packets. This means that node m will be informed about the credits transferred to it before time t only after a packet, broadcast after time t, is successfully received by m. At that point, it will update its credit set C(m, c). More formally, let $z_t^n(n,c,n=m)$ be the list of all credits transferred from n to m until time t, as seen by node n, and suppose that a packet broadcast by n at time t is successfully received. Then, node m receives $z_t^n(n,c,n=m)$, and it will add to its credits the set $$C(m,c) = C(m,c) \cup (z_t^n(n,c,m) \setminus z_t^m(m,c,n)).$$

Whenever a credit for flow c is transferred from node n to node m, then the transmission credit values are also updated. The value of the TC is updated by adding a transmission credit to TC(n,c,J) for all subsets J which contain node m (i.e. for all $J \subset DST(n,c)$ such that $m \in J$).

Figure 10:
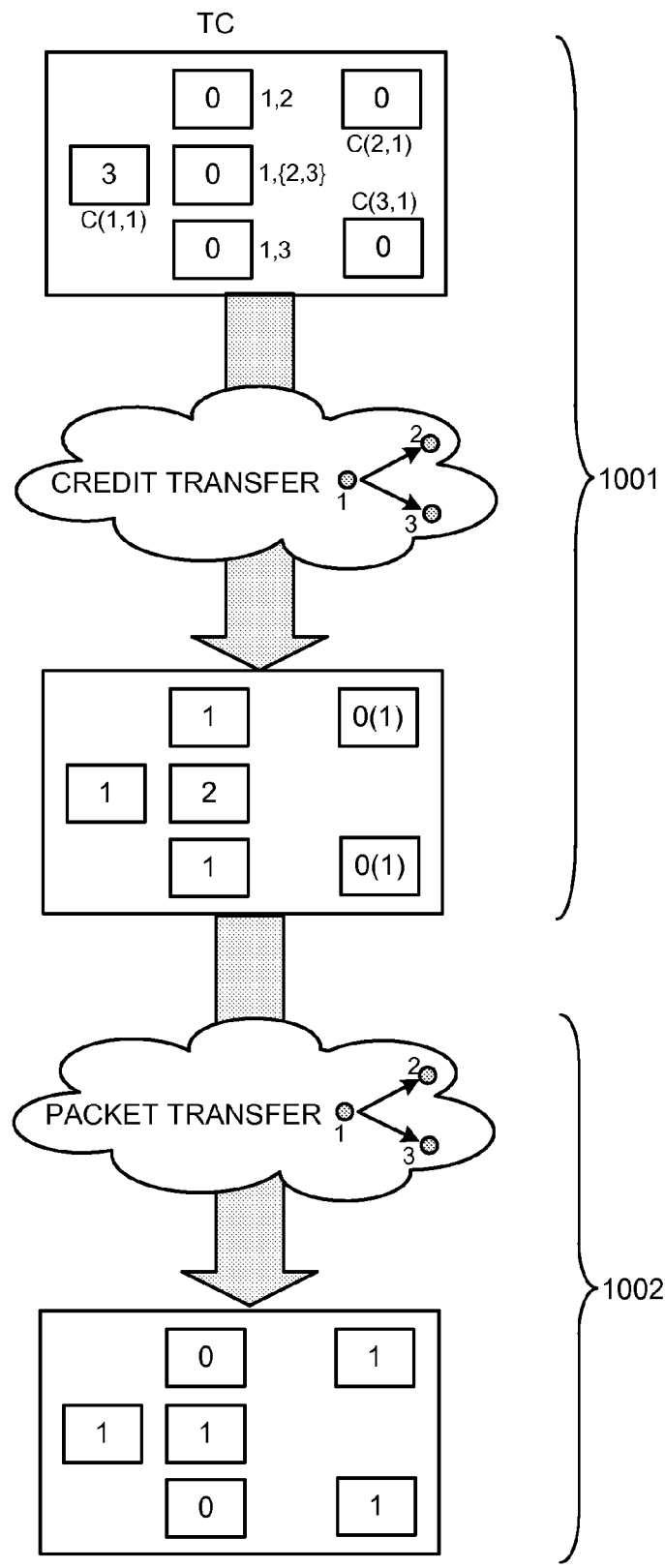
FIG. 10 shows a schematic diagram of the transfer of credit between nodes.

FIG. 10 shows a schematic diagram of the transfer of credit between nodes, as indicated by the bracketed portion 1001. Initially a node, node 1 has a per-node credit C(1,1) of 3, whilst its two next-hop nodes, nodes 2 and 3, each have per-node credits of zero. The routing decisions are therefore both true:

$$|C(1,1)| > |C(2,1)| + |CTC(1,1,2)|$$

→3>0+(0+0) is True $$|C(1,1)| > |C(3,1)| + |CTC(1,1,3)|$$

→3>0+(0+0) is True

If node 1 selects node 2 first and transfers a credit, the credits become:

C(1,1)=2

TC(1,2)=1

TC(1,{2,3})=1

TC(1,3)=0

C(2,1)=0(1)

C(3,1)=0

The notation for C(2,1) of 0(1) indicates that node 1 has transferred a credit to it and therefore node 1 considers the value of C(2,1) to equal 1. However as the credit update information is not actually transmitted to node 2 until a packet is sent to that node, node 2 still considers the value of C(2,1) to equal zero.

At this point, if the routing decisions are re-evaluated, only the routing decision for node 3 is found to be true:

$$|C(1,1)| > |C(2,1)| + |CTC(1,1,2)|$$

$$\rightarrow 2 > 1 + (1+1) \text{ is False}$$

$$|C(1,1)| > |C(3,1)| + |CTC(1,1,3)|$$

$$\rightarrow 2 > 0 + (0+1) \text{ is True}$$

After the transfer of a credit to node 3, the credits become:

$$C(1,1)=1$$

$$TC(1,2)=1$$

$$TC(1,\{2,3\})=2$$

$$TC(1,3)=1$$

$$C(2,1)=0(1)$$

$$C(3,1)=0(1)$$

After credit transfer and before packet transmission, nodes 2 and 3 are not yet aware of credit transfers, thus $|C^2(2, 1)|=0$, $|C^3(3, 1)|=0$. However, $|C^1(2, 1)|=1$, $|C^1(2, 1)|=1$ (values in brackets).

When a packet from flow c is successfully transmitted from node n to node m, one transmission credit corresponding to the packet generation is removed from TC(n,c,J) (if TC(n,c, J)>0) for each subset J which contains node m (i.e. for all J ⊂ DST(n,c) such that m∈J). Although it may appear that $\overline{TC(n, c, J)}$ is simply a union of TC(n, c, i) for all nodes within J (i.e. for all i∈J), this is not always the case. This is shown by the second part of FIG. 10 (indicated by bracket 1002) in which node 1 broadcasts a packet which is received by both nodes 2 and 3. As a result, one transmission credit corresponding to the packet generation is removed from TC(n,c,J) for each subset J containing node 2 or 3, which decreases TC(1,1,2) and TC(1,1,3) to empty sets and |TC(1, 1, {2, 3})| to 1. The value of |TC(1, 1, {2, 3})| is not decremented by 2, despite the fact that both nodes 2 and 3 successfully received a packet, because it was the same packet that was received by both nodes. Node 1 is able to determine from the acknowledgements received from nodes 2 and 3 that they both received the same packet because each packet has an identifier and this information is included within an acknowledgement. In order to finish the credit transfer (and therefore reduce all transmission credits to empty sets), it is still necessary to transmit successfully one packet, either to node 2 or node 3.

The routing decision above provides one example of a suitable routing decision. In another embodiment, the following decision may be used:

$$|C(n,c)| \geq |C(m,c)| + |CTC(n,c,m)|$$

Other embodiments may use different routing decisions based on the credits described herein.

Figure 11:
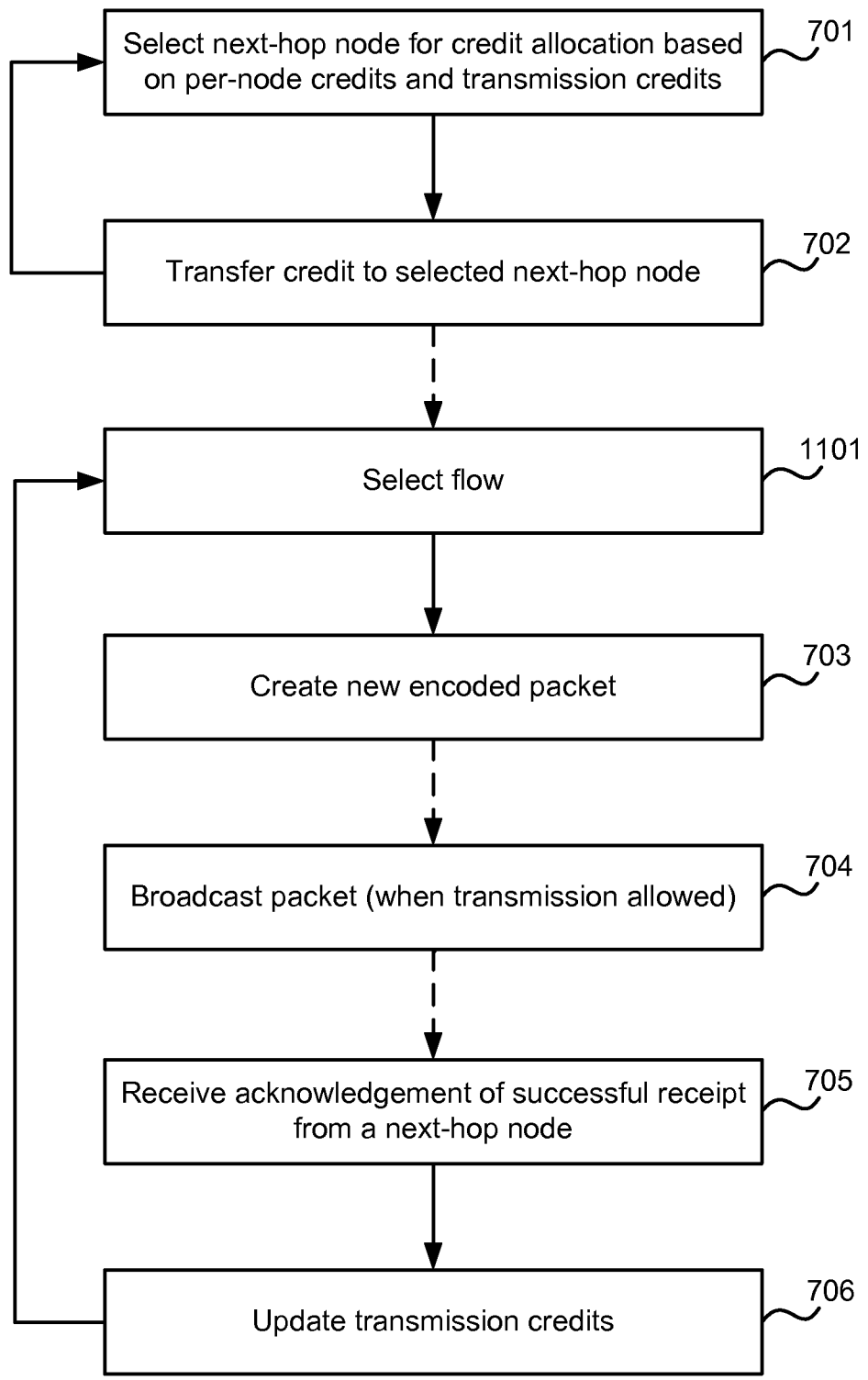
FIG. 11 shows a third example flow diagram of a method of operation of an intermediate node.

Due to the broadcast nature of the medium, scheduling is required to determine which node is able to transmit packets at any time and this is described below. Additionally as a node may be handling several different flows, the node must determine which flow will be given priority when that node has the ability to transmit a packet. This additional step (block 1101) is shown in the example flow diagram of FIG. 11 which shows the operation of an intermediate node and the flow diagram showing the operation of a source node (in FIG. 9) may be modified in a similar manner (and may further include the network coding step of block 703, as described above). The determination of which flow will be given priority (i.e. the selection of a flow) may be achieved by associating a utility function with a flow, U(f), where f is the throughput of a flow c (e.g. in unique packets per unit time). Seeking to maximize $\Sigma_f U(f)$ for a given network is equivalent to using a fairness criterion. For example, putting U(f)=log f gives proportional fairness and putting U(f)=−1/f gives TCP type fairness.

In an embodiment, a quality metric, Q(n,J) may be used to select a flow for transmission, where Q(n,J) is the quality metric for broadcast transmission from node n to subset J of next-hop nodes. This quality metric may correspond to the probability, as measured by node n, that at least one node from J will receive a packet transmitted from n. The transmission preference of a flow c at a node n can then be defined as:

$$W(n, c) = \sum_{J \subseteq DST_{(n,c)}} TC(n, c, J) Q(n, J)$$

The transmission preference of a node n can further be defined as:

$$W(n) = \max_c W(n,c)$$

The flow to be given priority can then be determined by:

$$c(n) = \arg\max_c W(n,c)$$

This has the effect that a flow with high backlog and a good chance of successful transmission will be selected by a node. This determination may be made when the node is given ability to transmit packets or in advance of this. Once the determination has been made of which flow has priority, the node can prepare a random linear combination of the packets buffered for the selected flow from the generation corresponding to the oldest transmission credit.

The quality metric, Q(n,J) may also be used to simplify the algorithms and equations described above. Where there are a large number of next-hop neighbors, the number of subsets, J, can become extremely large which may make some of the required computations time consuming and very processor intensive (e.g. those computations described above which require summing over all J). Where there are only two next-hop nodes there are 3 subsets (AB, A, B), where there are three next-hop nodes, there are 7 subsets (ABC, AB, AC, BC, A, B, C) etc. Consequently, the number of subsets considered may be limited (e.g. to 10 subsets or to a number dependent upon the size of a generation) and the subsets used may be selected from all possible subsets by the value of their quality metric, e.g. the 10 subsets with the largest values of Q(n,J). As the value of Q(n,J) may vary over time, the subsets used may be selected periodically through reassessment of the values of the quality metric for all subsets and therefore the subsets used may change over time. A routing protocol (such as VRR) may be used for selection of subsets.

In other examples, the situation where there are a large number of next-hop neighbors may be addressed in a different manner. The concept of sub-nets may be introduced where each sub-net comprises a group (or range) of nodes identified by a sub-net identifier. In this example, the methods may be as described above, with subsets comprising one or more sub-nets rather than one or more nodes. Each sub-net may comprise one or more nodes and in the limit that each sub-net comprises just one node, the method is the same as described above. However, this is likely to be less efficient than limiting the number of subsets (as described above).

Scheduling algorithms may be used to determine which node is able to transmit packets at any given time. The scheduling algorithm may use the transmission preference of a node, W(n), to decide which node gets an opportunity to transmit, giving preference to nodes with a higher value of W(n). Examples of suitable scheduling techniques are described in:

'A tutorial on cross-layer optimization in wireless networks' by X. Lin, N. Shroff, and R. Srikant, published in the IEEE Journal on Selected Areas in Communications, 24(8):1452-1463, June 2006.

'Stability properties of constrained queueing systems and scheduling policies for maximum throughput in multi-hop radio networks' by L. Tassiulas and A. Ephremides, published in IEEE Trans. on Automatic Control, 37(12), 1992.

'Throughput guarantees through maximal scheduling in wireless networks' by P. Chaporkar, K. Kar, and S. Sarkar, published in 43rd Allerton Conference, 2005.

An alternative scheduling policy which may be used is the scheduling implemented by 802.11 MAC. A further scheduling technique which may be used under 802.11e comprises adjusting the Arbitration Inter-Frame Space (AIFS) based on W(n), such that shorter AIFS are allocated to nodes with higher values of W(n).

The scheduling algorithm used may include a transmission timer associated with each node, such that after a defined period without being enabled to transmit (e.g. when the timer has decremented to zero), the node is given an opportunity to transmit a packet. Where no packet is queued for transmission (or no credit has been transferred and therefore no packet requires to be transmitted), the node may not necessarily transmit a packet. However, in other embodiments, the node may create and transmit a new encoded packet.

Whilst the above description refers to the transmission by one node at any one time, in some embodiments more than one node may transmit at any one time. This is particularly applicable to larger networks where distant nodes may transmit simultaneously without interfering and/or where nodes may be operating on different frequencies.

Figure 12:
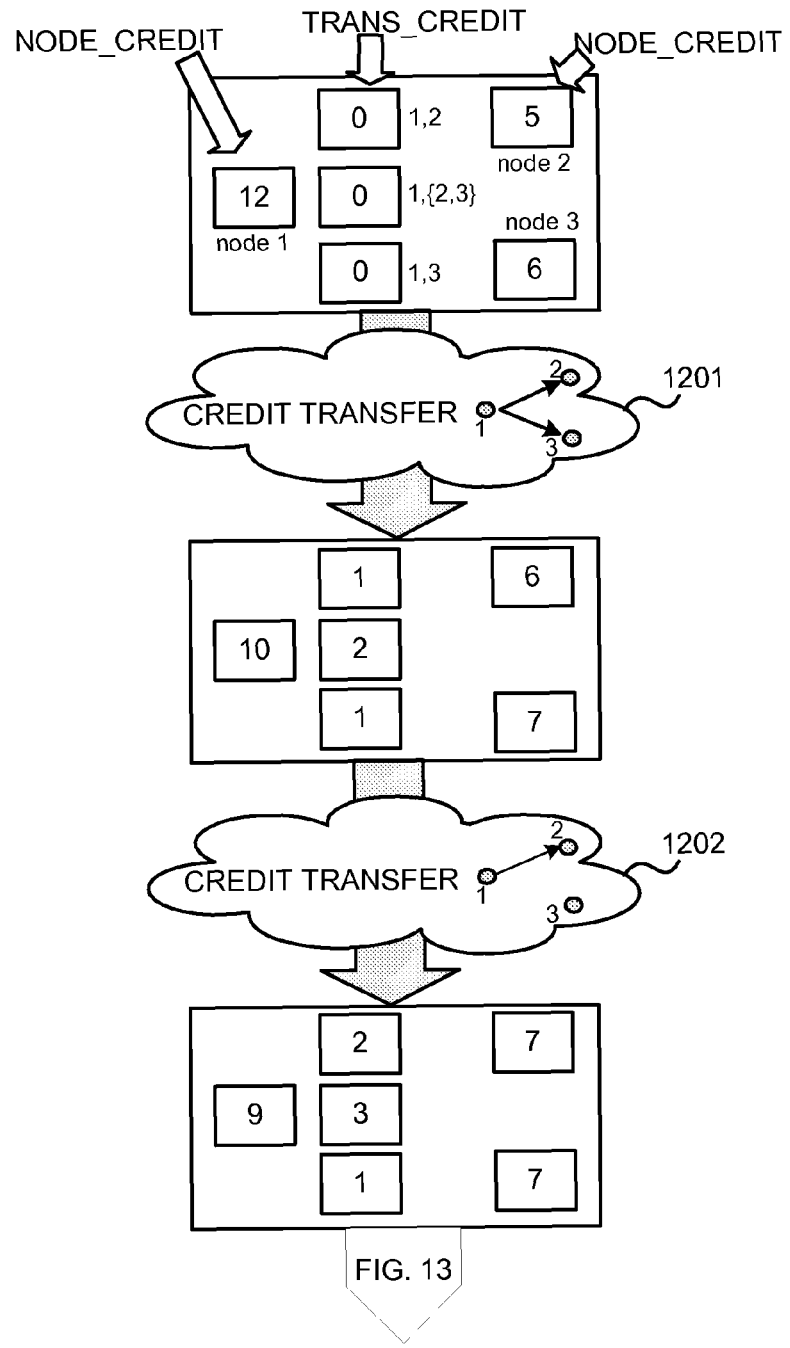
FIGS. 12 and 13 show a second schematic diagram of the transfer of credit and packets between nodes.
Figure 13:
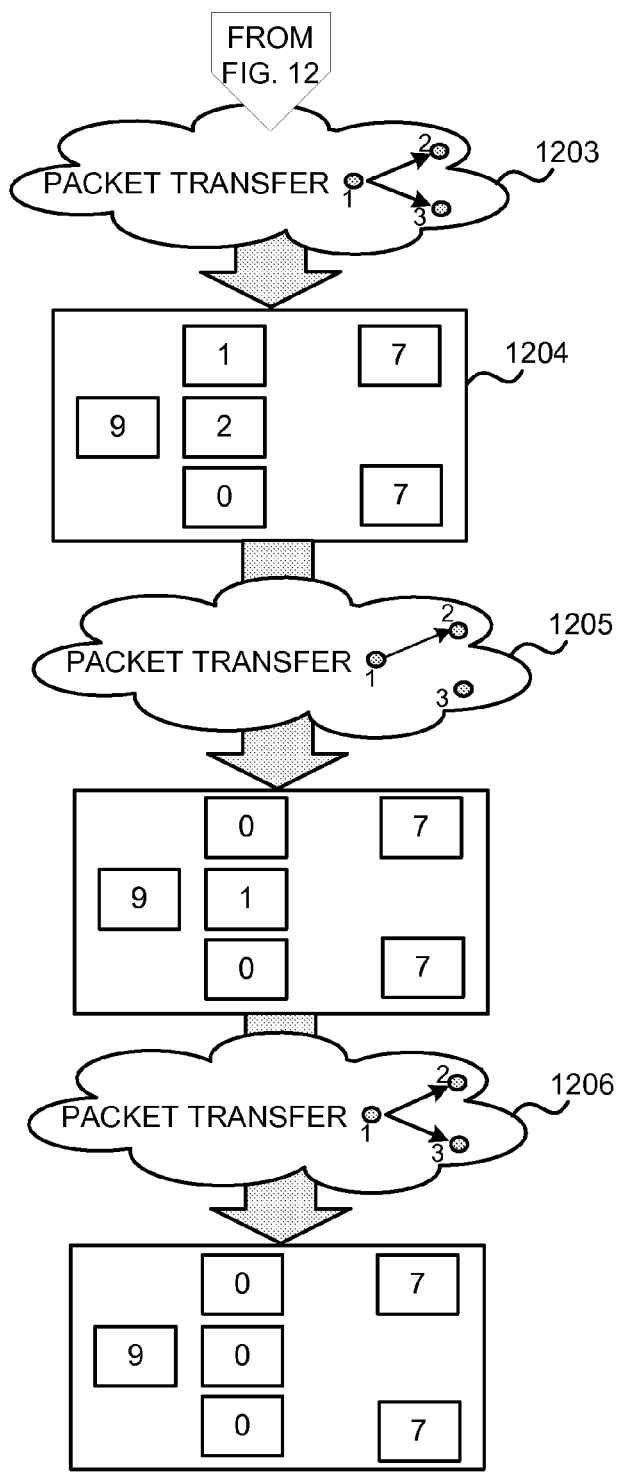

FIGS. 12 and 13 show a second schematic diagram of the transfer of credit and packets between nodes. It will be appreciated that this diagram (and the earlier example diagram shown in FIG. 10) are provided by way of example only. In this example, initially node 1 transfers a credit to each of nodes 2 and 3 (as indicated in cloud 1201). This has the effect of increasing the per-node credit (as stored at node 1) for nodes 2 and 3 by one and decreasing the per-node credit for node 1 by two. The transmission credit at this point is as follows:

$TC(1,2)=1$ $TC(1,\{2,3\})=2$ $TC(1,3)=1$

After this credit transfer, the routing decision is still true for node 2, but is false for node 3 (where the routing decision is $|C(n,c)|>|C(m,c)|+|CTC(n,c,m)|$). Another credit is therefore transferred to node 2 (as indicated in cloud 1202). At this point, the routing decisions for both nodes 2 and 3 are false so no further credit can be transferred until after packets have been successfully transferred and the transmission credits updated. If subsequently a packet is broadcast by node 1 and successfully received at both nodes 2 and 3 (as indicated in cloud 1203), the values of $TC(1,2)$, $TC(1,\{2,3\})$ and $TC(1,3)$ are each decremented by one (because only one packet was successfully transmitted). At this point the values of the per-node credits held at nodes 2 and 3 for those respective nodes would be updated to reflect the credits transferred by node 1 (e.g. to equal the values shown in FIG. 13 rectangle 1204). At this stage, the routing decisions for nodes 2 and 3 are still false, so further credit cannot be transferred by node 1 to either of these nodes. If another packet is broadcast by node 1 and only received at node 2 (as indicated in cloud 1205), the values of $TC(1,2)$ and $TC(1,\{2,3\})$ are each decremented by 1, such that the only transmission credit which is not zero is $TC(1,\{2,3\})$ which has a value of 1. This indicates that in order to satisfy the transmission credit, it is still necessary to transfer a packet to either node 2 or node 3. At this point, the routing decisions for both nodes 2 and 3 are now true and therefore it is possible for node 1 to transfer additional credit to either node (although this is not shown in FIG. 13). If a further packet is broadcast by node 1 and successfully received at either node 2 or 3 or at both nodes (as indicated in cloud 1206 of the example), the values of $TC(1,2)$, $TC(1,\{2,3\})$ and $TC(1,3)$ are each decremented by one, however as the values of $TC(1,2)$ and $TC(1,3)$ are already at zero, only the value of $TC(1,\{2,3\})$ is changed and becomes zero. At this point all transmission credits have been cleared and no further packets will be transferred until further credits are transferred by node 1 to either node 2 or node 3.

In parallel to the credit transfer shown in FIG. 12, nodes 2 and 3 may also be transferring credits and/or packets to their next-hop neighbors. Consequently the credit values stored by any node may be quite outdated and only periodically updated based on information in received packets.

In addition to credits, each node maintains a list of received packets from each flow c and the packets are stored in a packet buffer. The buffers may be of fixed size and therefore have an upper limit on the number of packets that any buffer can hold. When the buffers reach the upper limit on capacity and a new packet arrives, a queue replacement strategy may be used. In a first example of a suitable queue replacement strategy, the buffers may operate a first-in-first-out (FIFO) queue such that the oldest packet is removed from the list and the buffer. As described above, depending on the size of the generation, the buffers may be required to be quite large to avoid packet loss. Alternatively, however, due to the use of network coding, if an intermediate node becomes full (or close to capacity), rather than dropping packets from the buffer, the node may create a new encoded packet from a linear combination of some or all of the received packets from the same flow and store this packet instead of some or all of the packets from which this combination was made. This enables the buffers at intermediate nodes to be smaller than the size of the generation without impacting the performance of the system. In an embodiment, the size of the buffer may be varied based on the transmission credits associated with the node.

To limit the number of packets being stored/transferred within a system at any time (e.g. to reduce buffer requirements), the number of generations which are being transmitted within the mesh network may be limited (e.g. to two generations). In an example, when an intermediate node, which already has stored packets from a first and a second generation, receives a packet from a third generation, the packets from the first generation may be discarded. Generations may be identified sequentially such that packets from the earliest generation are discarded. In an alternative embodiment, once a destination has received sufficient linearly independent packets from a particular generation, it broadcasts a message which triggers each intermediate node to discard all packets from that generation.

In order to solve the linear system to recover coded packets, it is necessary and sufficient for the destination node to receive the same number of linear combinations as the number of original packets in the generation. In order to ensure that the destination receives enough packets, some implementations may include one or more error control mechanisms. Examples of two suitable mechanisms which may be used independently or in combination are hop-by-hop local recovery and end-to-end retransmissions.

Figure 14:
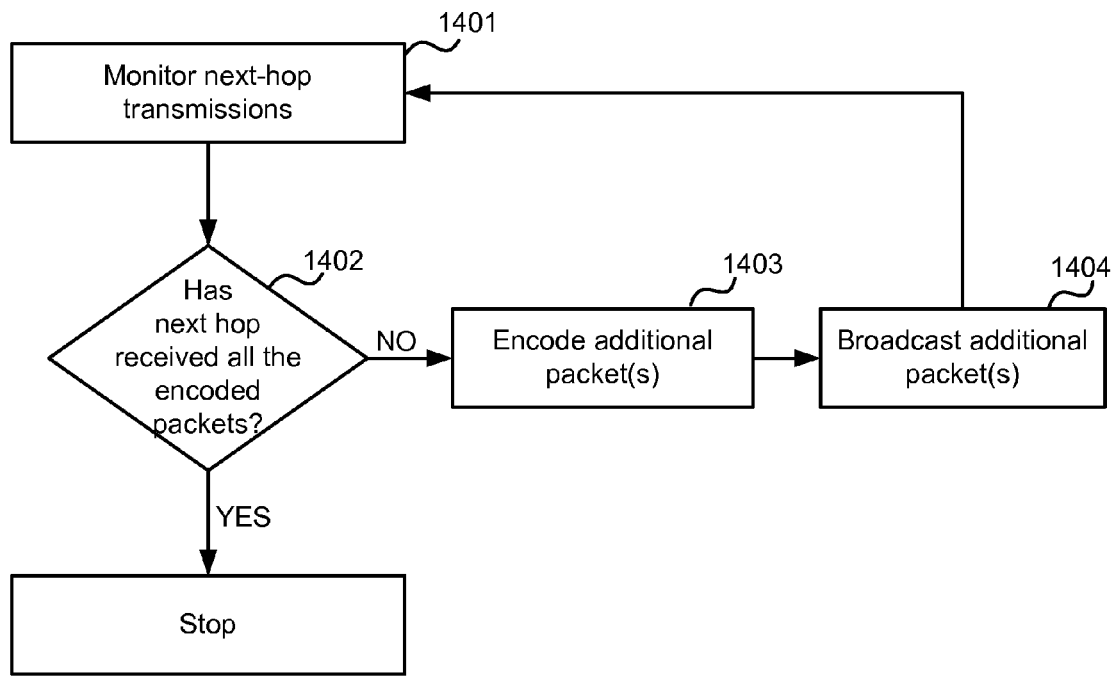
FIG. 14 shows an example flow diagram of a method of hop-by-hop local recovery.

Hop-by-hop local recovery may be achieved by processing 'passive acknowledgments'. Given the broadcast medium, a sending node (which may be the source node or an intermediate node) can potentially overhear what the next hop transmits. By monitoring these next hop transmissions (as shown in FIG. 14, block 1401), the sending node can determine if all the next hops have received all the transmitted packets between them (block 1402). If the sending node determines that particular transmitted packets have not been received by next hops ('No' in block 1402), the sending node can retransmit more combinations (block 1404). It may be necessary for the sending node to first encode these additional combinations (block 1403). For example, the sending node may transmit six packets, labeled 1-6. From passive acknowledgements, the sending node may determine that only five different packets were received in total by all the next-hop nodes and may therefore transmit one more encoded packet. If however, some native component (e.g. data relating to one of the original packets) is lost entirely at some part of the transmission route from source to destination, end-to-end recovery will be necessary. For example, if the generation comprises packets 1-6 and by the last hops all the packets comprise linear combinations of some or all of only packets 2-6, packet 1 will need to be rebroadcast in order that the destination node can decode the generation. End-to-end recovery is expensive and therefore it is beneficial to minimize its use where possible.

Figure 15:
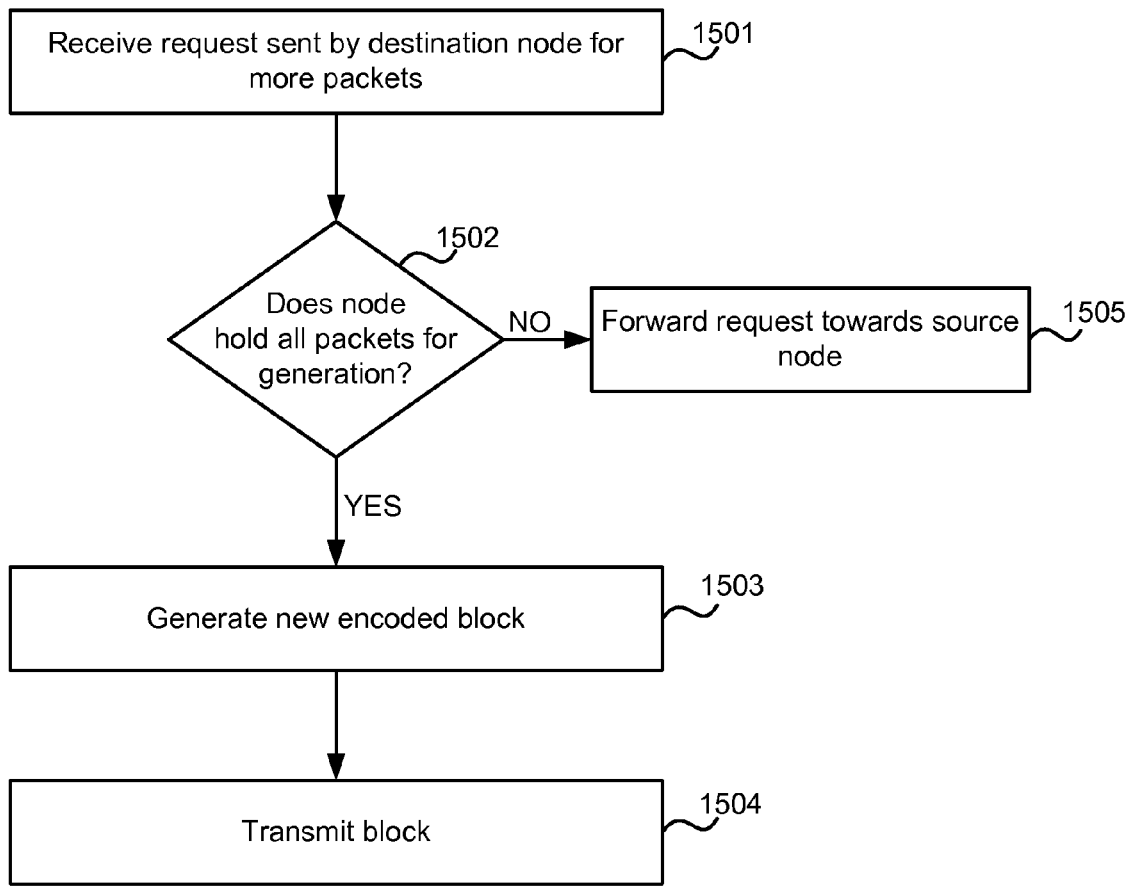
FIG. 15 shows an example flow diagram of a method of end-to-end recovery.

A 'pseudo' end-to-end mechanism, also referred to as end-to-end retransmissions, may be used for end-to-end recovery. The term 'pseudo' is used because it may not necessarily be true end-to-end recovery but may be intercepted by an intermediate node. The destination unicasts a request toward the source for more combinations for the given generation. If any intermediate node (which is acting as a relay) that receives the request (block 1501 of FIG. 15) has all components for the generation (as determined in block 1502), it intercepts the request and generates retransmissions (blocks 1503-1504). Otherwise, the intermediate node forwards on the request towards the source node (block 1505) along a single path. These retransmissions are also unicast towards the destination (rather than using the multiple path technique described above). Upon receipt of the request at the source node, the source node generates the requested additional combinations for the particular generation (i.e. using network coding) and sends these, using unicast, to the destination node.

For both the hop-by-hop and the end-to-end mechanisms, retransmitted packets are new linear combinations of all packets the node has received (or for the source, that the node has sent out).

In another implementation, instead of implementing a retransmission scheme, additional encoded packets may be transmitted so that the destination will receive enough packets to decode. However, transmission of redundant packets consumes extra network resources and reduces the performance of the system. Dependent on the reliability of the system and the performance required, different error correction schemes may be adopted.

A prototype system was built which implemented basic sets of the functionalities described above, including multi-path forwarding, coding on multiple paths, passive acknowledgements and error control. Details of this prototype system, testbed and the tests performed are provided by way of example only and are in no way limiting to the methods, systems or apparatus described herein. Initial testing focused on small topologies like the diamond topology shown in FIG. 1, where all paths from the source may be assumed equally good (for the purposes of the testing) and hence used simultaneously. The coding rate may be split even among the paths, and may be determined by the number of paths. In a testbed resembling the diamond topology shown in FIG. 1, all the nodes comprised laptops or desktop PCs equipped with Netgear (trade mark) 802.11a/g cards with the Atheros (trade mark) chipset. The default broadcast rate of 6 Mbps was used and the throughput of 800K UDP flow transfers for 2 parallel paths and a single path for two configurations of the diamond topology were compared, with the high and low loss rates between source and the first hops respectively. Different loss rates were produced by moving source very close to or very far from the first hops, and the relays were about 50 cm apart in both configurations. For the low loss case, the 2-path scenario showed a 17% throughput improvement, while for the high loss case the improvement was 25%.

Whilst in the above description, the credit information is described as being transmitted within the header of the next packet which is broadcast, this is by way of example only and in other embodiments, the credit information may be transmitted in other ways. For example, once credit has been transmitted to a next-hop node (i.e. allocated to that node within the credit transmitting node), the details of the credit may be transmitted using unicast to the particular next-hop node. In another embodiment, a separate (or different) channel may be used for transmission of credit update information.

The methods described above may be implemented for all or part of a particular flow. The methods may be implemented for all flows or for only flows meeting particular criteria; for example, the methods may be implemented only for flows which exceed a particular number of packets (e.g. flows which contain more than one packet). In another embodiment, the methods may be implemented for all flows but the methods may be modified for those flows which contain less than a predetermined number of packets (e.g. flows comprising one packet), e.g. by not using network coding and/or not using broadcast for these small flows. In a further embodiment, where flow type can be distinguished, the method may be implemented in different ways depending on flow type (e.g. different operation for TCP compared to UDP). In further embodiments, the credit scheme and/or flow control mechanism may be operated independently to other aspects of the methods described herein.

Figure 16:
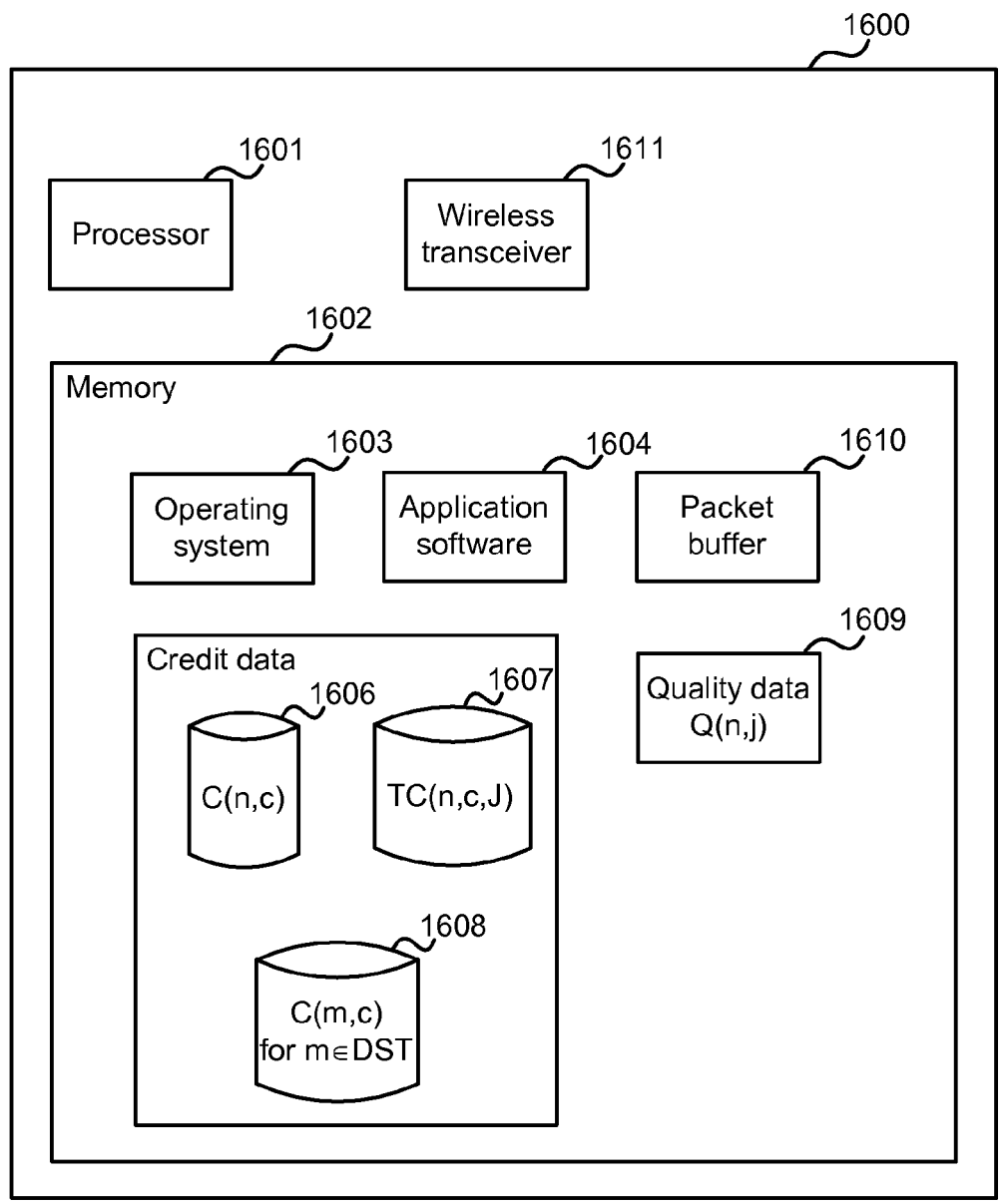
FIG. 16 illustrates an exemplary computing-based device in which embodiments of the methods described herein may be implemented.

FIG. 16 illustrates various components of an exemplary computing-based device 1600 which may be implemented as any form of a computing and/or electronic device, and in which may operate as a node in a wireless mesh network and in which embodiments of the methods described above may be implemented.

The computing-based device 1600 comprises one or more processors 1601 which may be microprocessors, controllers or any other suitable type of processors for processing computing executable instructions to control the operation of the device in order to perform any of the methods described herein. The computer executable instructions may be provided using any computer-readable media, such as memory 1602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

Platform software comprising an operating system 1603 or any other suitable platform software may be provided at the computing-based device to enable application software 1604 to be executed on the device. The memory may also be used to store the credit data 1605, such as the per-node credit for the node and each flow 1606, the transmission credits 1607 and the per-node credits for the next-hop neighbor nodes 1608. The memory may also comprise the quality data 1609 and packet buffer 1610.

The computing-based device 1600 may further comprise a wireless transmitter and receiver or transceiver 1611 and one or more inputs which are of any suitable type for receiving media content, Internet Protocol (IP) input, etc (not shown in FIG. 16). The device may also comprise one or more outputs (also not shown in FIG. 16) such as an audio and/or video output to a display system integral with or in communication with the computing-based device. The display system may provide a graphical user interface, or other user interface of any suitable type although this is not essential.

Although the present examples are described and illustrated herein as being implemented in a computer-based device as shown in FIG. 16, the device described is provided as an example and not a limitation. As those skilled in the art will appreciate, the present examples are suitable for application in a variety of different types of devices.

Although a prototype system using 802.11 technology is described above, the system described is provided as an example and not a limitation. As those skilled in the art will appreciate, the present examples are suitable for application in a variety of different types of wireless systems, including but not limited to WiFi, WiMAX, UWB (Ultra-Wideband) and Bluetooth. In an example, the methods described herein may be implemented in an ad-hoc network of wireless enabled devices such as mobile telephones, PDAs etc. In another example, the system may not be ad-hoc but may be configured with devices over larger timescales. The devices involved (i.e. as nodes) may be fixed or mobile.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person. Additionally, aspects of any of the embodiments may be combined with aspects of other embodiments to create further embodiments without losing the effect sought.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of transmitting data packets across a wireless mesh network from a source node to a destination node via at least one intermediate node, the method comprising, at each intermediate node:
   selecting a next-hop node from a set of possible next-hop nodes based on a measure of link congestion and a measure of the backlog of packets for a data flow at each of the set of possible next-hop nodes;
   declaring intent of packet transmission to the selected next-hop node, the declaring comprising transferring a credit to the selected next-hop node, the transferring resulting in an increase in transmission credits to downstream nodes in each data flow containing the selected next-hop node;
   creating a new encoded packet from a linear combination of packets stored at the intermediate node associated with a portion of the data flow; and
   broadcasting the new encoded packet.

2. A method according to claim 1, further comprising:
   receiving a packet associated with a portion of the data flow from another node.

3. A method according to claim 2, further comprising:
   storing said packet;
   sending an acknowledgement message; and
   updating a credit value for the data flow associated with said intermediate node.

4. A method according to claim 3, wherein said acknowledgement message comprises a passive acknowledgement.

5. A method according to claim 1, further comprising:
determining said set of possible next-hop nodes.

6. A method according to claim 1, wherein said measure of the backlog of packets at each of the set of possible next-hop nodes comprises:
a list of credits for the data flow associated with each of the set of possible next-hop nodes, wherein a credit associated with a node corresponds to a data packet from the data flow which is to be transmitted by the node.

7. A method according to claim 6, wherein said measure of link congestion comprises:
a list of transmission credits for the data flow associated with links to each of a plurality of subsets of possible next-hop nodes, wherein a transmission credit associated with a link corresponds to a data packet from the data flow which is to be transmitted to a next-hop node within the subset.

8. A method according to claim 7, wherein selecting a next-hop node from a set of possible next-hop nodes based on a measure of link congestion and a measure of the backlog of packets at each of the set of possible next-hop nodes comprises:
selecting a next-hop node from the set of possible next-hop nodes based on the list of credits for the data flow associated with each of the set of possible next-hop nodes and the list of transmission credits for the data flow associated with links to each of a plurality of subsets of possible next-hop nodes; and
transferring a credit to the selected next-hop node.

9. A method according to claim 8, wherein selecting a next-hop node from the set of possible next-hop nodes based on the list of credits for the data flow associated with each of the set of possible next-hop nodes and the list of transmission credits for the data flow associated with links to each of a plurality of subsets of possible next-hop nodes comprises:
selecting a next-hop node from the set of next-hop nodes which satisfies a relation:

$$|C(n,c)| > |C(m,c)| + |CTC(n,c,m)|$$

where $C(n,c)$ comprises a credit value for the data flow associated with said intermediate node, $C(m,c)$ comprises the credit for the data flow associated with the next-hop node and $CTC(n,c,m)$ comprises the sum of transmission credits for each subset of possible next-hop nodes which includes said next-hop node.

10. A method according to claim 8, further comprising:
receiving an acknowledgement of successful receipt of the new encoded packet from a next-hop node; and
updating the transmission credits associated with links to subsets of possible next-hop nodes which include said next-hop node from which the acknowledgement is received.

11. A method according to claim 1, further comprising, prior to creating a new encoded packet from a linear combination of packets stored at the intermediate node associated with a portion of the data flow:
selecting a data flow from a plurality of data flows associated with the intermediate node.

12. A method according to claim 1, further comprising at the source node:
creating a packet associated with a portion of a data flow; and
updating a credit value for the data flow associated with said source node.

13. A method according to claim 12, further comprising at the source node:
selecting a next-hop node from a set of possible next-hop nodes based on a measure of link congestion and a measure of the backlog of packets for the data flow at each of the set of possible next-hop nodes; and
broadcasting a packet.

14. A method according to claim 1, further comprising:
monitoring transmissions by next-hop nodes;
determining if a next-hop node has received sufficient encoded packets; and
if a next-hop node has not received sufficient encoded packets, encoding an additional packet and broadcasting the additional packet.

15. A method according to claim 1, further comprising, at an intermediate node:
receiving a request for more packets from a portion of a data flow sent by the destination node;
determining if said intermediate node holds all the packets from the portion of the data flow;
if said intermediate node holds all the packets, generating a new encoded block for the portion of the data flow and transmitting the new encoded block; and
if said intermediate node does not hold all the packets, forwarding said request towards the source node.

16. A method of transmitting data packets across a wireless mesh network from a source node to a destination node via at least one intermediate node, the method comprising:
performing network coding at each intermediate node; and
at each intermediate node, controlling the rate of broadcast of packets based on congestion of links to each of a set of possible next-hop nodes in the network and on backlog of packets at each of the set of possible next-hop nodes,
wherein congestion of links and backlog of packets are determined based on credits associated with each link and with each next-hop node, and wherein credits are transferred between nodes as a declaration of intent to transmit a packet of data from a data flow, and credits are updated at each next-hop node upon successful transmission of a packet of data from the data flow to one of the set of possible next-hop nodes.

17. A method according to claim 16, wherein controlling the rate of broadcast of packets based on congestion of links to each of a set of possible next-hop nodes in the network and on backlog of packets at each of the set of possible next-hop nodes comprises:
controlling the rate of broadcast of packets based on congestion of links to each of a set of possible next-hop nodes in the network, backlog of packets at each of the set of possible next-hop nodes and a backlog of packets for transmission by said intermediate node.

18. A node in a wireless mesh network comprising:
a processor;
a wireless transmitter; and
a memory arranged to store executable instructions arranged to cause the processor to:
select a next-hop node from a set of possible next-hop nodes based on a measure of link congestion and a measure of the backlog of packets for a data flow at each of the set of possible next-hop nodes,
wherein congestion of links and backlog of packets are determined based on credits associated with each link and with each next-hop node, and wherein credits are transferred between nodes as a declaration of intent to transmit a packet of data from the data flow, and credits are updated at each next-hop node upon successful transmission of a packet of data from the data flow to one of the set of possible next-hop nodes.

19. A node according to claim 18, wherein the memory is further arranged to store executable instructions arranged to cause the processor to:

create a new encoded packet from a linear combination of packets stored at the node associated with a portion of the data flow.

\* \* \* \* \*